(12) United States Patent
Kon et al.

(10) Patent No.: US 7,864,481 B1
(45) Date of Patent: Jan. 4, 2011

(54) EVALUATING DISTRIBUTION OF PEAK SIGNALS REPRESENTING REFERENCE TRACK CROSSINGS TO COMPENSATE FOR THERMAL EXPANSION WHEN WRITING SPIRAL TRACKS TO A DISK

(75) Inventors: Kenneth R. Kon, Irvine, CA (US); Hsueh-Chieh Wu, Mountain View, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 47 days.

(21) Appl. No.: 12/359,979

(22) Filed: Jan. 26, 2009

(51) Int. Cl.
*G11B 21/02* (2006.01)
(52) U.S. Cl. ....................................... 360/75
(58) Field of Classification Search ................ None
See application file for complete search history.

(56) References Cited

U.S. PATENT DOCUMENTS

| | | | |
|---|---|---|---|
| 4,107,746 A | 8/1978 | Conway | |
| 5,010,535 A | 4/1991 | Davis | |
| 5,668,679 A | 9/1997 | Swearingen et al. | |
| 6,091,564 A | 7/2000 | Codilian et al. | |
| 6,507,450 B1 | 1/2003 | Elliott | |
| 6,937,420 B1 | 8/2005 | McNab et al. | |
| 6,943,978 B1 | 9/2005 | Lee | |
| 6,967,799 B1 | 11/2005 | Lee | |
| 6,977,789 B1 | 12/2005 | Cloke | |
| 6,985,316 B1 | 1/2006 | Liikanen et al. | |
| 6,992,848 B1 | 1/2006 | Agarwal et al. | |
| 6,992,852 B1 | 1/2006 | Ying et al. | |
| 7,002,761 B1 | 2/2006 | Sutardja et al. | |
| 7,016,134 B1 | 3/2006 | Agarwal et al. | |
| 7,054,083 B2 | 5/2006 | Ehrlich | |
| 7,088,533 B1 | 8/2006 | Shepherd et al. | |
| 7,133,239 B1 | 11/2006 | Hartman et al. | |
| 7,145,744 B1 | 12/2006 | Clawson et al. | |
| 7,253,985 B1 * | 8/2007 | Gami et al. | 360/75 |
| 7,321,479 B2 | 1/2008 | Kim et al. | |
| 7,502,195 B1 | 3/2009 | Wu et al. | |
| 2003/0197968 A1 | 10/2003 | Sacks et al. | |
| 2006/0007585 A1 | 1/2006 | Ehrlich et al. | |
| 2006/0103967 A1 | 5/2006 | Kim et al. | |
| 2006/0171058 A1 | 8/2006 | Chan et al. | |
| 2006/0171059 A1 | 8/2006 | Chan et al. | |

OTHER PUBLICATIONS

US 6,906,885, 06/2005, Agarwal et al. (withdrawn)

* cited by examiner

*Primary Examiner*—K. Wong

(57) ABSTRACT

A method of writing a spiral track on a disk of a disk drive is disclosed. A plurality of reference tracks are written on the disk. A head is moved over the reference tracks to generate a read signal comprising a plurality of peak signals, wherein each peak signal corresponds to a reference track crossing. At least one of a starting radial location and a velocity profile is adjusted in response to a distribution of the peak signals, and the spiral track is written on the disk using the starting radial location and the velocity profile. In one embodiment, the distribution of the peak signals represents a uniform and a non-uniform expansion of a mechanical component.

24 Claims, 7 Drawing Sheets

EVALUATING DISTRIBUTION OF PEAK SIGNALS REPRESENTING REFERENCE TRACK CROSSINGS TO COMPENSATE FOR THERMAL EXPANSION WHEN WRITING SPIRAL TRACKS TO A DISK

BACKGROUND

Description of the Related Art

When manufacturing a disk drive, concentric servo sectors $2_0$-$2_N$ are written to a disk 4 which define a plurality of radially-spaced, concentric servo tracks 6 as shown in the prior art disk format of FIG. 1. The concentric servo sectors are said to form servo wedges or servo spokes from the outer to inner diameter of the disk. Each concentric servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the concentric servo sectors $2_0$-$2_N$ on the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral tracks on the disk which are then processed to write the concentric servo sectors along a circular path. Each spiral track is written on the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the servo write clock is used to write the concentric servo sectors at the appropriate circular location as well as at the appropriate frequency.

In order to write the concentric servo sectors at the proper disk locations during the self-servo writing operation, it is important for the spiral tracks to be written on the disk with a uniform spacing between the spiral tracks. If a spiral track writer is used to write the spiral tracks individually, various components of the spiral track writer as well as the disk itself may experience thermal expansion. In addition, the effect of thermal expansion may not be uniform around the circumference of the disk (relative to the head). If the spiral tracks are written without compensating for this thermal expansion, the resulting non-uniform spacing between the spiral tracks may degrade and/or render the concentric servo sectors inoperable.

There is, therefore, a need to compensate for thermal expansion when writing spiral tracks to a disk of a disk drive.

DETAILED DESCRIPTION OF EMBODIMENTS OF THE INVENTION

Figure 2A:
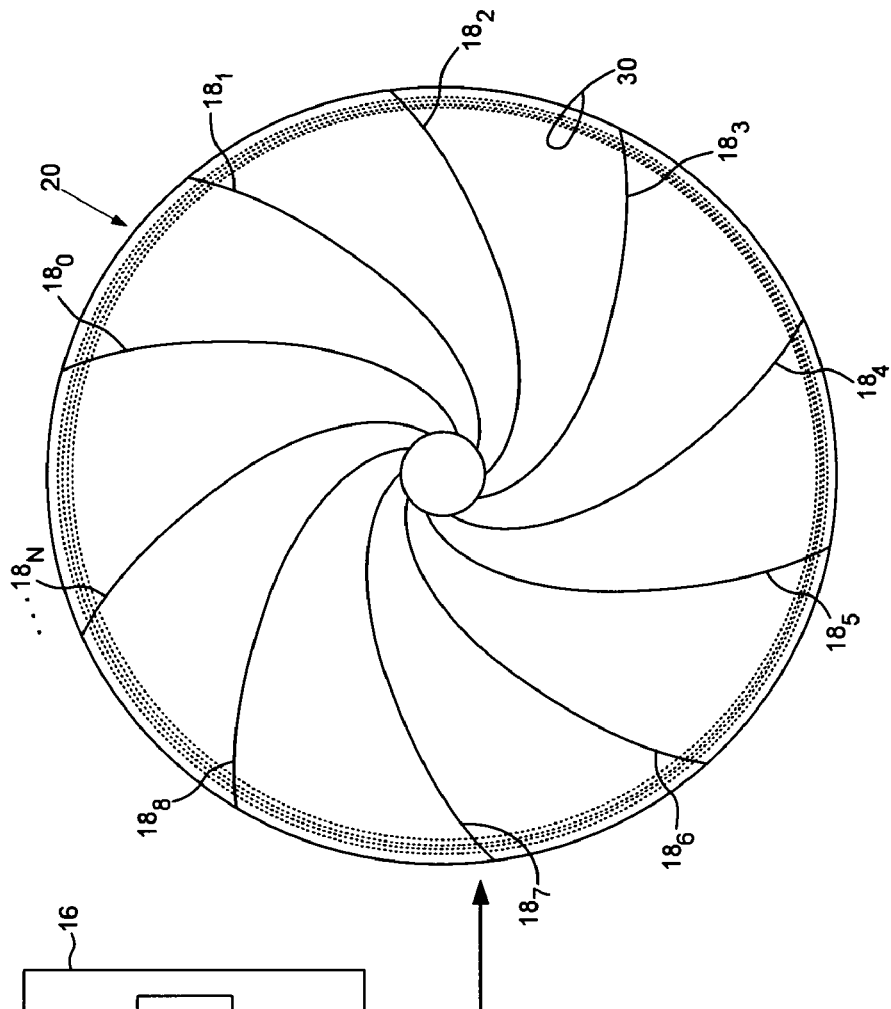
FIG. 2A shows a spiral track writer according to an embodiment of the present invention.
Figure 4:
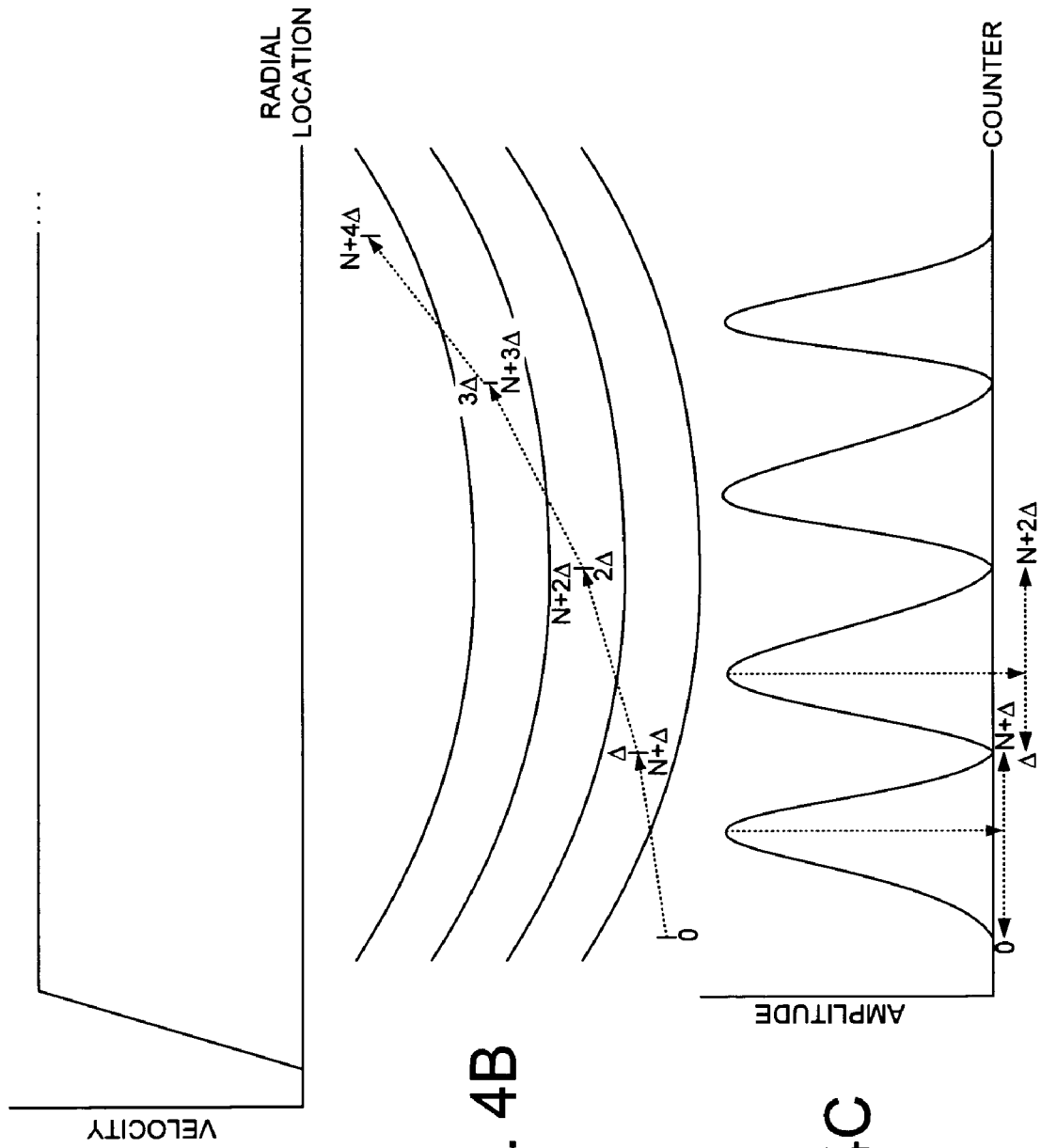
FIGS. 4A-4C illustrate an embodiment of the present invention wherein a head is moved over the reference tracks at a constant velocity to generate a distribution of peak signals, wherein each peak signal corresponds to a reference track crossing.

FIG. 2A shows a spiral track writer 16 according to an embodiment of the present invention for writing a spiral track 18, on a disk 20 of a disk drive 22. The spiral track writer 16 comprises a head positioner 24 operable to position a head 26 radially over the disk 20, and control circuitry 28 operable to write the spiral track 18, on the disk 20. A plurality of reference tracks 30 are written on the disk 20. The head 26 is moved over the reference tracks 30 to generate a read signal comprising a plurality of peak signals, wherein each peak signal corresponds to a reference track crossing (FIG. 4C). At least one of a starting radial location and a velocity profile is adjusted in response to a distribution of the peak signals, and the spiral track 18, is written on the disk 20 using the starting radial location and the velocity profile.

In the embodiment of FIG. 2A, a head disk assembly (HDA) 32 is connected to the servo data writer 16, wherein the HDA 32 houses the disk 20, a spindle motor for rotating the disk 20, and a head 26 connected to a distal end of an actuator arm 34 which is rotated about a pivot in order to position the head radially over the disk 20. The head positioner 24 of the spiral track writer 16 moves the actuator arm 34 using a head positioning pin 36 inserted into the HDA 32 while writing the spiral tracks $18_0$-$18_N$. During normal operation of the disk drive 22, a voice coil motor (VCM) 38 rotates the actuator arm 34 about the pivot in order to position the head 26 radially over the disk.

Prior to writing the spiral tracks on the disk 20, a servo write clock 40 is synchronized to the disk rotation by timing circuitry 42. In one embodiment, a clock track written at the outer diameter of the disk 20 is read by a clock head 44 inserted into the HDA 32 to generate a clock signal 46. Timing circuitry 42 processes the clock signal 46 (e.g., using a phase-locked loop) in order to synchronize the servo write clock 40. In an alternative embodiment, the clock signal 46 may be generated from the back electromotive force (BEMF) voltage generated by the spindle motor. When writing a spiral track 18, on the disk 20, the servo write clock 40 enables the control circuitry 28 to begin writing the spiral track 18, at the appropriate circumferential location in a manner that maintains a substantially constant spacing between the spiral tracks.

In an alternative embodiment to the spiral track writer 16, a media writer may be used to write the spiral tracks $18_0$-$18_N$ to a number of disks, and thereafter one or more disks are installed into the HDA 32. In yet another embodiment, the control circuitry 48 within each disk drive 22 may be used to write the spiral tracks $18_0$-$18_N$ on the disk 20. For example, in one embodiment one of a plurality of disk surfaces within the disk drive 22 may be prewritten with concentric servo sectors which are processed by the control circuitry 48 in order to servo the heads while writing the spiral tracks $18_0$-$18_N$ to the other disk surfaces.

In the embodiment of FIG. 2A, the entire disk drive 22 is shown as being connected into the spiral track writer 16. In an alternative embodiment, only the HDA 32 is connected to the spiral track writer 16, and in one embodiment, the HDA 32 is connected through the same interface used by the control circuitry 48. That is, the control circuitry 28 within the spiral track writer 16 comprises suitable circuitry for processing the read signal emanating from the head 26 similar to the control circuitry 48 within each disk drive 22.

Figure 3:
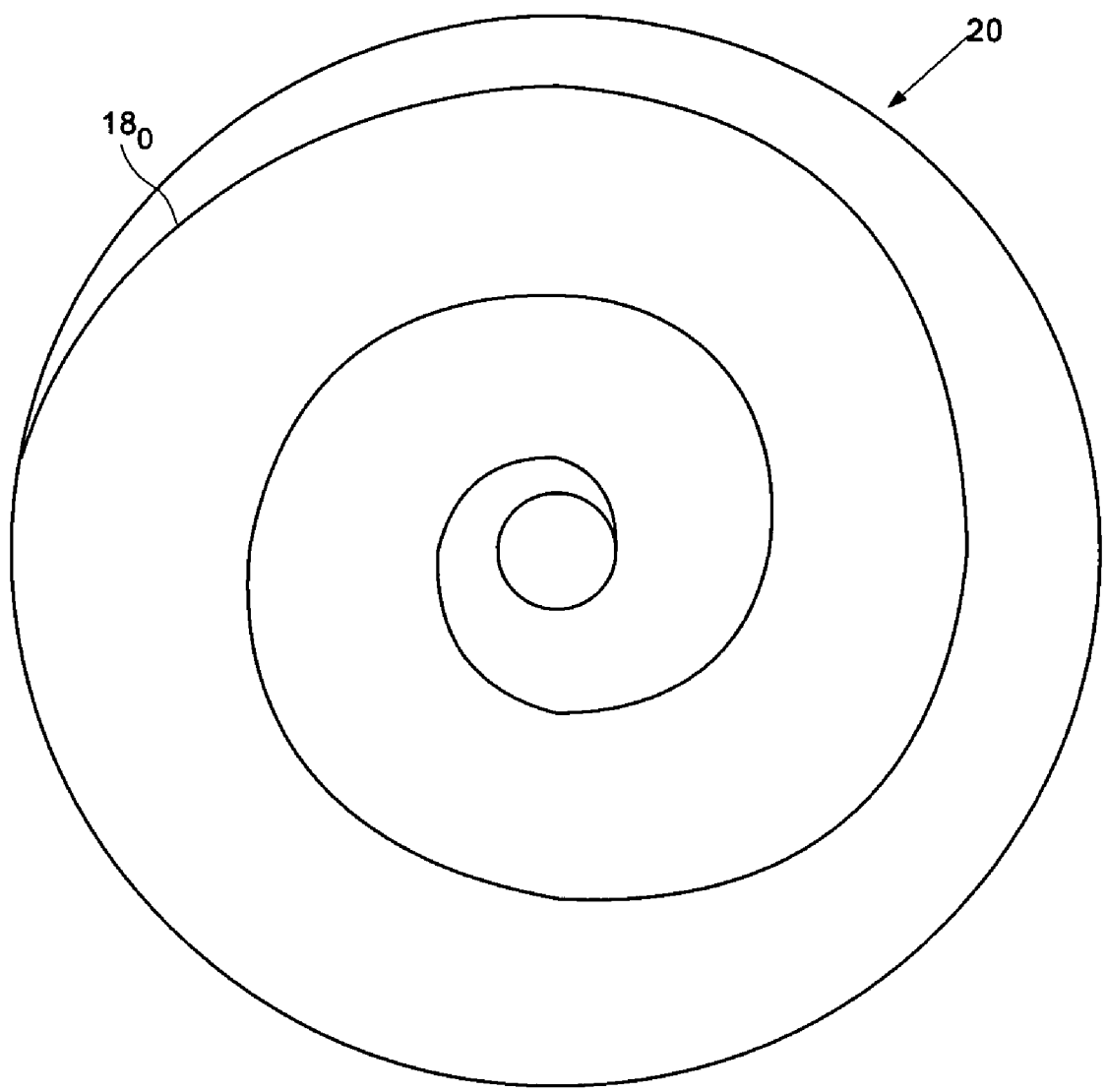
FIG. 3 shows an embodiment wherein each spiral track is written over multiple disk revolutions.

Each spiral track 18, is written over a partial revolution of the disk 20 in the embodiment of FIG. 2A. In other embodiments, each spiral track may be written over at least one disk revolution, and in an embodiment shown in FIG. 3, over multiple disk revolutions. The number of revolutions depends on the radial velocity of the head as well as the angular velocity the disk while writing each spiral track. Each spiral track 18, may comprise any suitable pattern, and in one embodiment, each spiral track comprises a high frequency signal interrupted periodically by a sync mark. Each reference track 30 may also comprise any suitable pattern, and in one embodiment, each reference track 30 comprises a continuous high frequency signal so that the amplitude of the read signal forms a suitable peak signal waveform such as shown in FIG. 4C regardless as to where the head crosses each reference track.

While writing the spiral tracks on the disk, the disk as well as other mechanical components may deform due to thermal expansion. This thermal expansion may include a uniform expansion, which affects the target starting radial location and velocity profile in general, as well as non-uniform expansion which affects the starting radial location and velocity profile for each specific spiral track. It is desirable to compensate for this thermal expansion to reduce spacing error and achieve a uniform shape for all of the spiral tracks.

FIG. 4A shows an example velocity profile that may be used in one embodiment to move the head over the reference tracks in order to generate the peak signal distribution shown in FIG. 4C. In one embodiment, the head is moved at a constant velocity over the reference tracks thereby generating peak signals in the read signal representing the reference track crossings. In the embodiment of FIG. 4C, a counter clocked with the servo write clock 40 represents a circumferential location of the head, and the read signal is correlated with the counter value to generate the distribution of the peak signals. Also in the embodiment of FIG. 4C, the spiral track writer positions the actuator arm 34 at a starting position (independent of the disk) using a position encoder, and then moves the head over the reference tracks according to the velocity profile shown in FIG. 4A.

In the embodiment of FIG. 4C, the head is moved over the reference tracks such that a reference track crossing spans fractionally more than one revolution of the disk. This is illustrated in FIGS. 4B and 4C where the first reference track crossing signal begins at counter value 0 and ends at counter value N+Δ, where there are N counts in one revolution of the disk. The next reference track crossing signal begins at counter value Δ (the counter wraps after N counts) and ends at counter value N+2Δ, and so on. In an alternative embodiment, the head is moved over the reference tracks such that a reference track crossing spans fractionally less than one revolution of the disk. Each reference track crossing signal (peak signal) has a peak that is correlated with the corresponding counter value as shown in FIG. 4C.

Any suitable number of reference tracks may be employed in the embodiments of the present invention. In one embodiment, a sufficient number of reference tracks are employed such that the peak signals representing the reference track crossings are distributed around the entire circumference of the disk. In this manner, the distribution of peak signals provides an indication of the uniform as well as the non-uniform effect of thermal expansion prior to writing any one of the spiral tracks.

Figure 5:
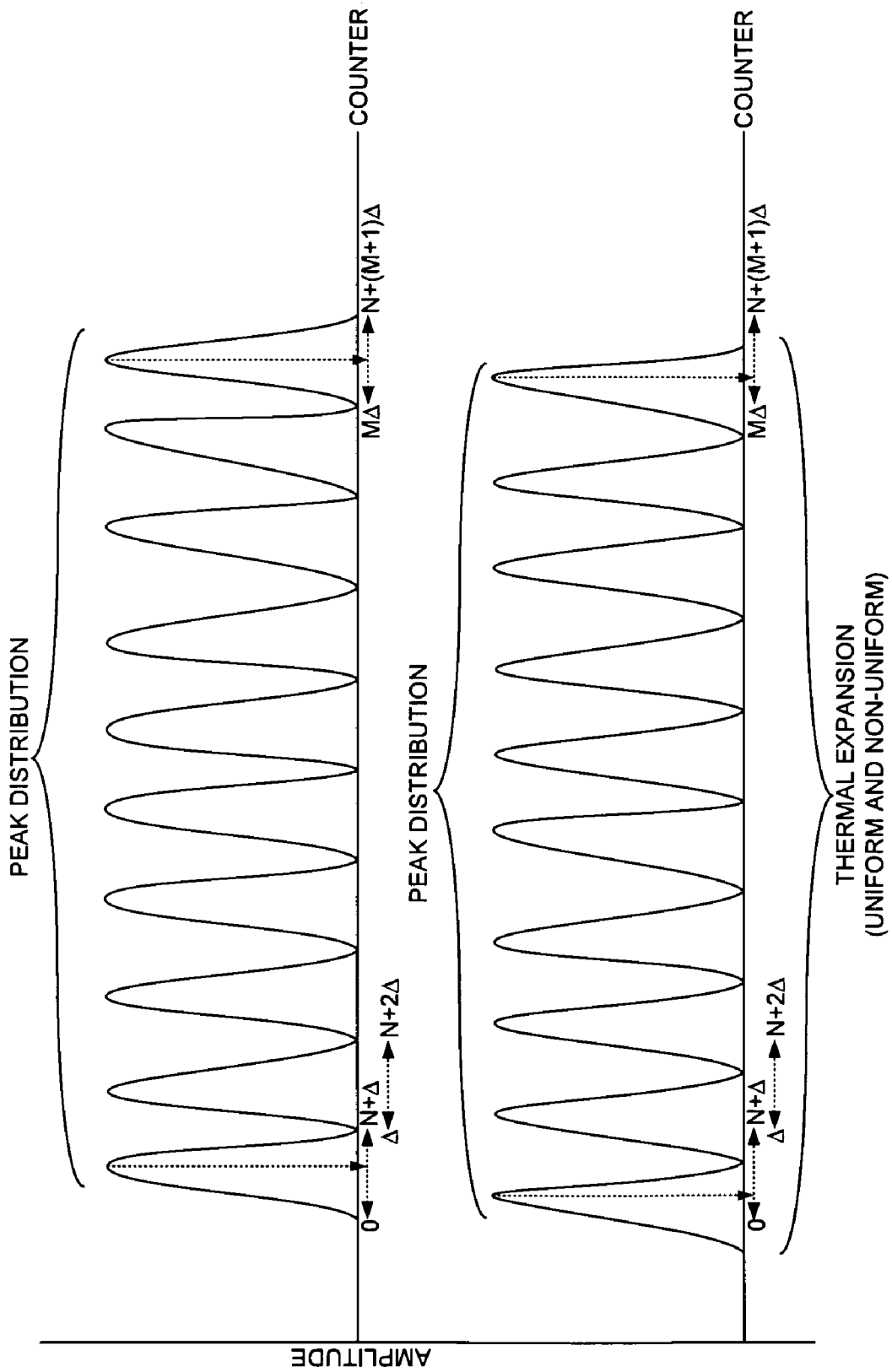
FIG. 5 illustrates how the distribution of peak signals can be used to help compensate for thermal expansion according to an embodiment of the present invention.

The effect of thermal expansion on the peak signal distribution is illustrated in the waveforms of FIG. 5, wherein the top waveform represents an initial peak signal distribution (e.g., prior to writing the first spiral track), and the bottom waveform represents a peak signal distribution later in the spiral writing process (e.g., after writing a certain number of spiral tracks). The bottom waveform shows how the location of each peak (counter value) in the peak signals shifts due to uniform and non-uniform thermal expansion. Detecting the shift of each peak may be done, for example, by reading the initial peak positions and storing the values for later comparison with other peak readings. By evaluating the shift of each peak relative to the circumferential location of each peak, the starting radial location and/or the velocity profile used to write the next spiral track can be modified accordingly. That is, the target circumferential location of the next spiral track is known, and therefore the effect of thermal expansion at the target circumferential location can be compensated by evaluating the shift in the peaks near the target radial location.

Figure 6:
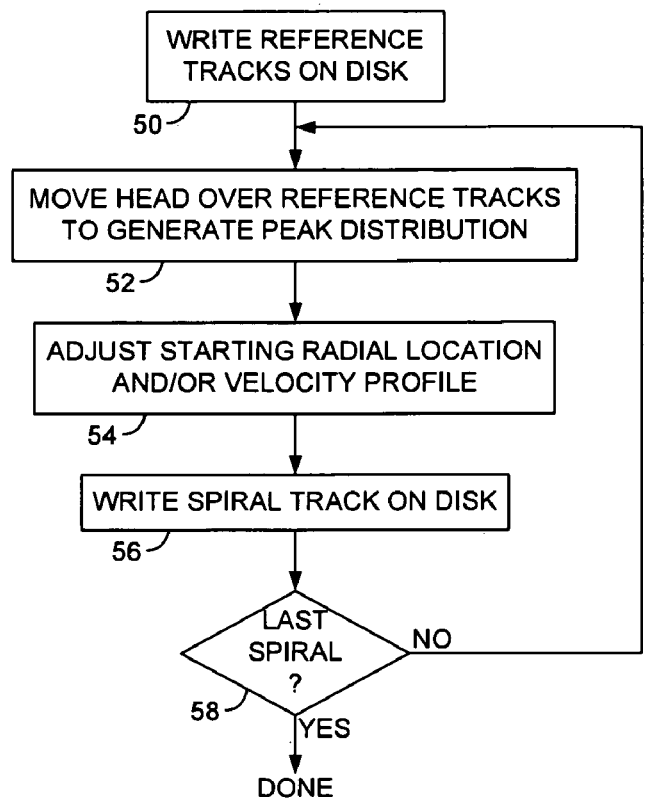
FIG. 6 is a flow diagram according to an embodiment of the present invention wherein a starting radial location and/or velocity profile for writing each spiral track is adjusted in response to the peak signal distribution.

The effect of thermal expansion may be compensated at any suitable interval, such as prior to writing each spiral track. This embodiment is shown in the flow diagram of FIG. 6 wherein a plurality of reference tracks are written on the disk (step 50). Prior to writing each spiral track, the head is moved over the reference tracks to generate the distribution of peaks representing the reference track crossings (step 52). The peak signal distribution is evaluated in order to adjust the starting radial location and/or the velocity profile (step 54) used to write the next spiral track on the disk (step 56). If there are more spiral tracks to write (step 58), the process is repeated by moving the head over the reference tracks to generate the next peak signal distribution, including the peak shifts due to uniform and non-uniform thermal expansion.

Figure 7:
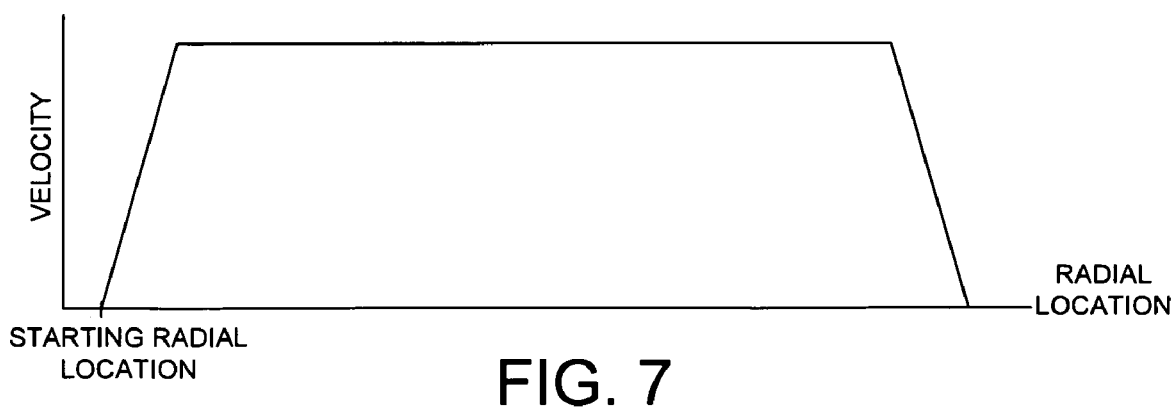
FIG. 7 shows a velocity profile for writing a spiral track according to an embodiment of the present invention.

FIG. 7 shows an example starting radial location and velocity profile for writing a spiral track on the disk. In one embodiment, the starting radial location is determined by a position encoder independent of the disk. For example, the head positioner 24 of FIG. 2A may comprise a position encoder that tracks the location of the actuator arm 34 independent of the disk 20. In one embodiment, as thermal heating causes one or more components to expand (e.g., the disk), the starting radial location is shifted outward by an amount determined from the peak signal distribution. As the disk expands, there is a corresponding increase in the physical length of the next spiral track. To compensate for the increase in physical length, the velocity profile shown in FIG. 7 may be shifted upward to compensate for the increase in seek distance across the surface of the disk, thereby maintaining a substantially uniform shape and spacing between the spiral tracks.

Figure 8:
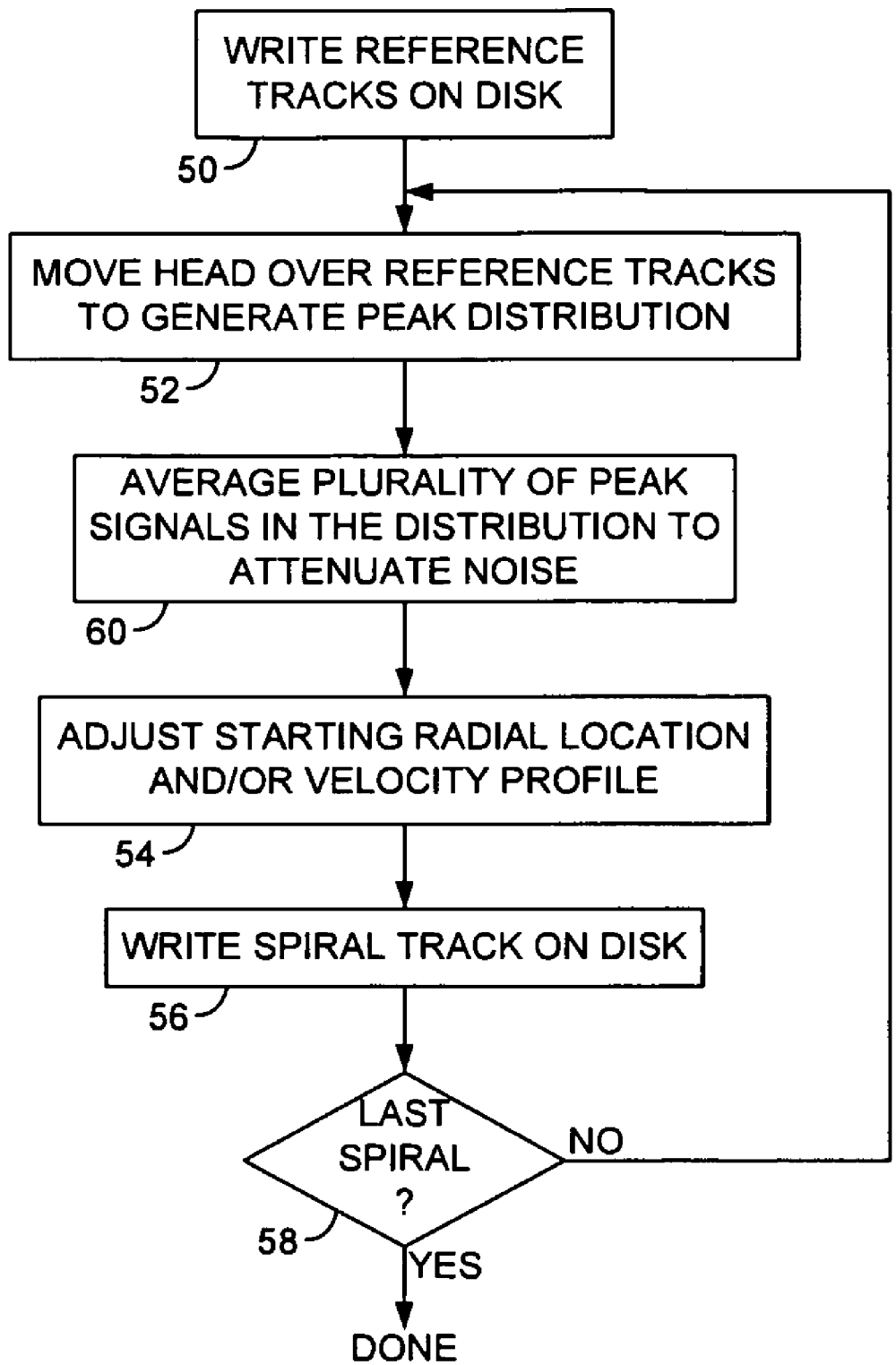
FIG. 8 is a flow diagram according to an embodiment of the present invention wherein a plurality of peak signals are averaged (a running average filter) in order to attenuate noise in the peak crossing signals.

In one embodiment, the dominant component of non-uniform thermal expansion causes an eccentricity in the reference tracks 30. If the radial spacing of the reference tracks 30 is small, the effect of the eccentricity will change slowly across the peak signal distribution. Thus, in an embodiment illustrated in the flow diagram of FIG. 8 the noise in each peak signal can be attenuated by averaging a plurality of the peak signals in the peak signal distribution (step 60). That is, each peak signal can be smoothed by passing a plurality of the peak signals through a running average filter.

Figure 2B:
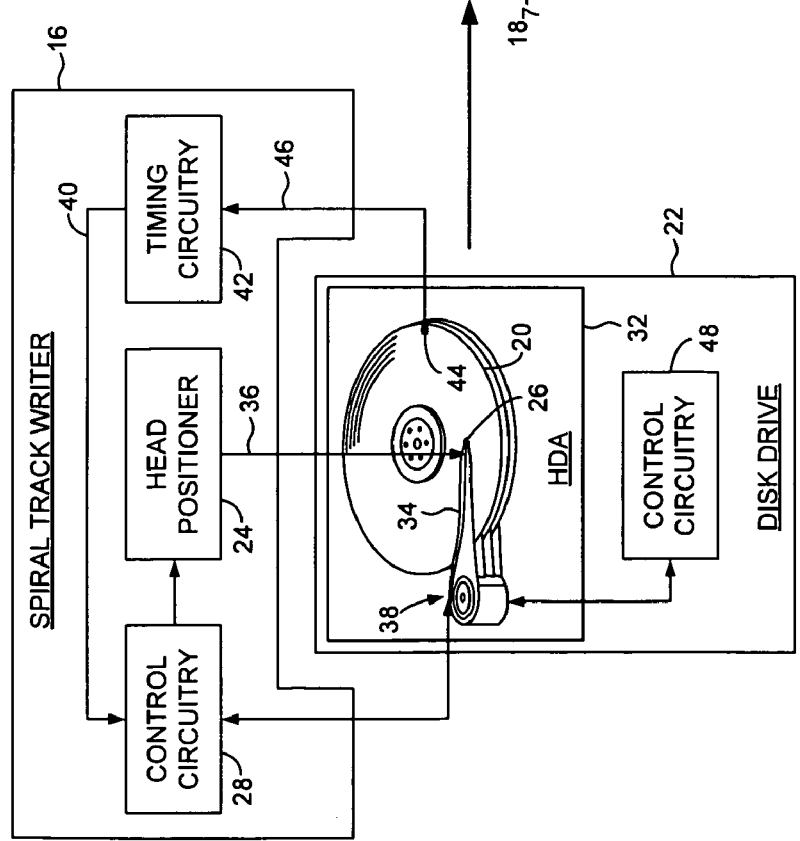
FIG. 2B shows a disk comprising a plurality of concentric reference tracks used to compensate for thermal expansion according to an embodiment of the present invention.

In the embodiment of FIG. 2B, a single set of reference tracks 30 are employed at the outer diameter of the disk 20. In an alternative embodiment, multiple sets of reference tracks 30 may be employed at different radial locations across the disk 20, for example, at the outer diameter, the middle diameter, and the inner diameter. The resulting peak signal distribution of each set of reference tracks may improve the estimate of thermal expansion and the resulting adjustment of at least one of the starting radial location and the velocity profile used to write each spiral track.

In one embodiment, the reference tracks 30 (FIG. 2B) are written on a single disk surface and used to adjust the starting radial location and/or velocity profile for the spiral tracks written to a plurality of disk surfaces in a bank write mode. In another embodiment, the reference tracks 30 are written to each disk surface and used to compensate for thermal expansion as the spiral tracks are written to each disk surface in a serial write mode.

In one embodiment, concentric servo sectors are written to a master disk surface, which are then used to write spiral tracks to other disk surfaces (e.g., self-written by the control circuitry 48 within each disk drive 22). In one embodiment, the reference tracks 30 for compensating for thermal expansion are also written only on the master disk surface, and the spiral tracks bank written to the other disk surfaces. In an alternative embodiment, the reference tracks 30 are written to each disk surface and used to compensate for thermal expansion while writing the spiral tracks to each disk surface in a serial write operation. In the former embodiment, the starting position and velocity of the head are controlled relative to the master disk surface, and therefore the thermal expansion detected from the peak signal distribution is relative to the master disk surface.

Figure 1:
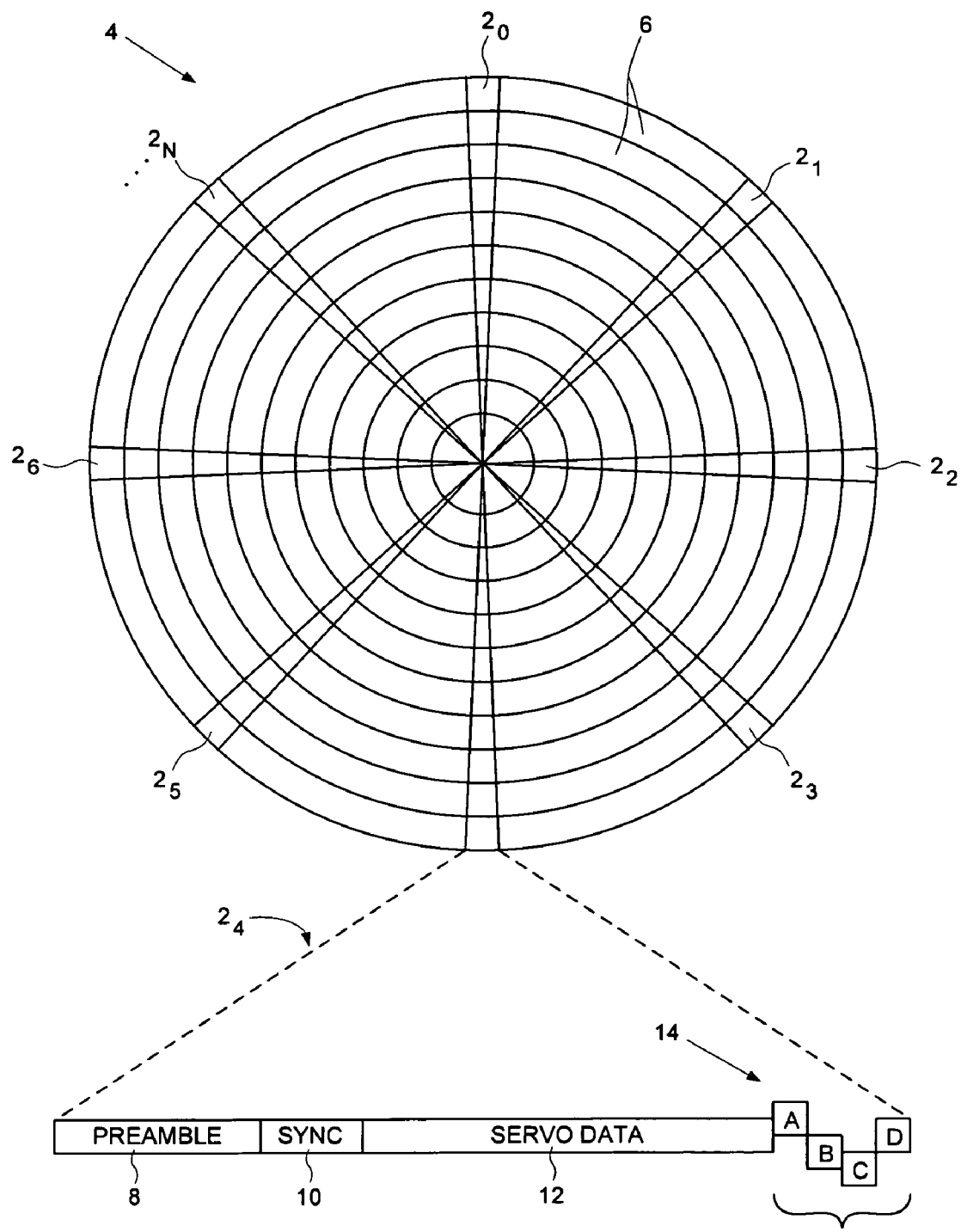
FIG. 1 shows a prior art disk format including a plurality of tracks defined by a plurality of concentric servo sectors.

In one embodiment, after writing the spiral tracks to each disk surface, the spiral tracks are further processed using well known techniques in order to write concentric servo sectors to each disk surface (e.g., as shown in FIG. 1). The concentric servo sectors are then used to servo the head during normal operation of the disk drive. In an alternative embodiment, the spiral tracks may comprise sufficient position information (e.g., track address) in order to servo the head during normal operation without writing concentric servo sectors.

In the embodiment wherein the disk drive self-servo writes the spiral tracks, any suitable control circuitry may be employed to implement the flow diagrams disclosed herein, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of writing a spiral track on a disk of a disk drive, the method comprising:
    writing a plurality of reference tracks on the disk;
    moving a head over the reference tracks to generate a read signal comprising a plurality of peak signals, wherein each peak signal corresponds to a reference track crossing;
    adjusting at least one of a starting radial location and a velocity profile in response to a circumferential distribution of the peak signals; and
    writing the spiral track on the disk using the starting radial location and the velocity profile.

2. The method as recited in claim 1, wherein the head is moved over the reference tracks at a substantially constant velocity.

3. The method as recited in claim 1, further comprising:
    generating an encoder count representing a circumferential location of the head; and
    correlating the read signal with the encoder count to generate the distribution of the peak signals.

4. The method as recited in claim 1, wherein the head is moved over the reference tracks such that a reference track crossing spans fractionally more than one revolution of the disk.

5. The method as recited in claim 1, wherein the head is moved over the reference tracks such that a reference track crossing spans fractionally less than one revolution of the disk.

6. The method as recited in claim 1, wherein the distribution of the peak signals represents a uniform expansion of a mechanical component.

7. The method as recited in claim 1, wherein the distribution of the peak signals represents a non-uniform expansion of a mechanical component.

8. The method as recited in claim 1, wherein the distribution of the peak signals represents a uniform and a non-uniform expansion of a mechanical component.

9. The method as recited in claim 1, further comprising comparing the distribution of the peak signals to an initial distribution of the peak signals to determine a shift in the peak signals, wherein at least one of the starting radial location and the velocity profile is adjusted in response to the shift in the peak signals.

10. The method as recited in claim 1, further comprising averaging a plurality of the peak signals to attenuate noise in each peak signal.

11. The method as recited in claim 1, wherein the plurality of reference tracks span a small fraction of the disk.

12. A spiral track writer for writing a spiral track on a disk of a disk drive, the spiral track writer comprising:
- a head positioner operable to position a head radially over the disk; and
- control circuitry operable to:
  - move the head over a plurality of reference tracks written on the disk to generate a read signal comprising a plurality of peak signals, wherein each peak signal corresponds to a reference track crossing;
  - adjust at least one of a starting radial location and a velocity profile in response to a circumferential distribution of the peak signals; and
  - write the spiral track on the disk using the starting radial location and the velocity profile.

13. The spiral track writer as recited in claim 12, wherein the control circuitry moves the head over the reference tracks at a substantially constant velocity.

14. The spiral track writer as recited in claim 12, wherein the control circuitry is further operable to:
- generate an encoder count representing a circumferential location of the head; and
- correlate the read signal with the encoder count to generate the distribution of the peak signals.

15. The spiral track writer as recited in claim 12, wherein the control circuitry moves the head over the reference tracks such that a reference track crossing spans fractionally more than one revolution of the disk.

16. The spiral track writer as recited in claim 12, wherein the control circuitry moves the head over the reference tracks such that a reference track crossing spans fractionally less than one revolution of the disk.

17. The spiral track writer as recited in claim 12, wherein the distribution of the peak signals represents a uniform expansion of a mechanical component.

18. The spiral track writer as recited in claim 12, wherein the distribution of the peak signals represents a non-uniform expansion of a mechanical component.

19. The spiral track writer as recited in claim 12, wherein the distribution of the peak signals represents a uniform and a non-uniform expansion of a mechanical component.

20. The spiral track writer as recited in claim 12, wherein the control circuitry is further operable to compare the distribution of the peak signals to an initial distribution of the peak signals to determine a shift in the peak signals, wherein at least one of the starting radial location and the velocity profile is adjusted in response to the shift in the peak signals.

21. The spiral track writer as recited in claim 12, wherein the control circuitry is further operable to average a plurality of the peak signals to attenuate noise in each peak signal.

22. The spiral track writer as recited in claim 12, wherein the plurality of reference tracks span a small fraction of the disk.

23. A disk drive comprising:
- a disk;
- a head actuated over the disk; and
- control circuitry operable to:
  - move the head over a plurality of reference tracks written on the disk to generate a read signal comprising a plurality of peak signals, wherein each peak signal corresponds to a reference track crossing;
  - adjust at least one of a starting radial location and a velocity profile in response to a circumferential distribution of the peak signals; and
  - write a spiral track on the disk using the starting radial location and the velocity profile.

24. The disk drive as recited in claim 23, wherein the plurality of reference tracks span a small fraction of the disk.

* * * * *